United States Patent [19]
Piazza

[11] Patent Number: 6,129,270
[45] Date of Patent: Oct. 10, 2000

[54] SCANNER FOR CHECKS, OR SIMILAR FINANCIAL DOCUMENTS, PROVIDED WITH A SUPPORT BRACKET FOR HOUSING A KEYBOARD

[76] Inventor: Attilio Piazza, Via Vanvitelli 46, 20129 Milano, Italy

[21] Appl. No.: 08/836,928
[22] PCT Filed: Sep. 16, 1996
[86] PCT No.: PCT/EP96/04072
§ 371 Date: Aug. 4, 1997
§ 102(e) Date: Aug. 4, 1997
[87] PCT Pub. No.: WO97/11436
PCT Pub. Date: Mar. 27, 1997

[30] Foreign Application Priority Data

Sep. 19, 1995 [IT] Italy ................................. MI95U0635
Aug. 28, 1996 [IT] Italy ................................. MI96U0586

[51] Int. Cl.[7] .................................................. G06F 17/60
[52] U.S. Cl. ........................................ 235/379; 361/680
[58] Field of Search .................................. 235/379, 449, 235/486; 902/20, 24, 34; 361/680

[56] References Cited

U.S. PATENT DOCUMENTS 4,623,965  11/1986  Wing .
4,733,060   3/1988  Dono et al. .
5,062,609  11/1991  Hames et al. ............................ 248/676
5,204,811   4/1993  Bednar et al. .......................... 364/406
5,245,169   9/1993  Nakano ................................... 235/486
5,438,186   8/1995  Nair et al. .............................. 235/449
5,590,020  12/1996  Sellers .................................... 361/680
5,679,938  10/1997  Templeton et al. ..................... 235/379
5,708,560   1/1998  Kumar et al. .......................... 361/680

FOREIGN PATENT DOCUMENTS

0670557A2   6/1995  European Pat. Off. .
2583538     6/1985  WIPO .
WO95/17735  6/1995  WIPO .

Primary Examiner—Karl D. Frech
Attorney, Agent, or Firm—Helfgott & Karas, P.C.

[57] ABSTRACT

A scanner or reader for checks, or similar financial documents, is provided with a support bracket, arranged adjacent to the base thereof, for housing thereon a keyboard of an electronic processor. The support bracket is equipped with quick engageable and disengageable fastening means, to make the keyboard either joined to or removed from the bracket, according to the needs, and the body of the scanner is provided with stopping means for providing irremovability of the keyboard with respect to the support bracket.

21 Claims, 6 Drawing Sheets

SCANNER FOR CHECKS, OR SIMILAR FINANCIAL DOCUMENTS, PROVIDED WITH A SUPPORT BRACKET FOR HOUSING A KEYBOARD

The present invention consists of a scanner for checks, or similar financial or banking documents, provided with a support bracket to which can be fastened, removably at will, a usual keyboard for electronic processor.

BACKGROUND OF THE INVENTION

Magnetic or optical scanner or readers for checks are in use since long time. These scanners are particularly used in accounting departments of banks and similar financial organizations for receiving and processing data related to banking documents, such as checks, bank receipts, bills of exchange, etc. As in said departments is always present at least an electronic data processor, these scanners are interfaced with the processor through a proper connection.

Further, to the processor is connected at least a keyboard and a display, so that on the desk of the processor operator must be present at least the check scanner, the keyboard and the display.

As there are room problems in arranging the above mentioned items on a desk, it has been proposed, as a first solution for reducing encumbrances, the use of a reader or scanner for checks incorporated in a keyboard for electronic processors, as for example disclosed in the published European Patent Application, indicated as EP-A-0 670 557, filed on Mar. 2, 1995 and published on Sep. 6, 1995, having the same applicant and inventor of the present application. In such an application is disclosed a scanner or reader incorporated in a keyboard to be connected to an electronic processor allowing to reduce the space taken by the peripheral equipments of the electronic processor consisting of the keyboard and the scanner.

Such a scanner works undoubtedly well, however has the problems of being suited just for those electronic processors needing a standard keyboard, while in the case of processors needing a dedicated keyboard, as sometimes it happens in bank departments having their own procedure needs, people are compelled either to give up the scanner, having the incorporated keyboard, or to try to modify the incorporated keyboard according to the proper procedures, which is, not only particularly engaging and tedious, but can also result impossible.

SUMMARY OF THE INVENTION

To remedy such a drawback preventing from using the check scanner of the above mentioned EP-A-0 670 557 in case of not standard keyboards, in order to have at least the advantage of sparing room, it has been devised, according to the present invention, to provide a scanner for checks, having a body provided with a front protruding bracket base serving for support of a keyboard, specific for a personal computer, but otherwise of common size, and provided with means for fastening the keyboard to the base, wherein:

the fastening means consist of at least a latch, provided with at least a spring, which is pulled to allow the keyboard to be arranged on the base and then released to fasten the keyboard to the base itself, and on the wall of the body of the check scanner facing the bracket base there is at least a stopping projection which, being superimposed to the keyboard, prevents any chance of disconnection from the bracket base.

Preferably, the latches provided with springs are two in number and the latches are provided with hooked brackets helping in maintaining the keyboard adhering to the bracket base.

Moreover, as besides the readers of check bands exist and are more and more widespread also readers of all the data of the checks, also known as check scanners, carrying out simultaneously the front and rear reading of both the faces thereof, as well as, exist equipments scanning and processing documents, such as readers and printers, especially for post office account forms or the like, there exists the need to couple a processor keyboard also to them analogously to what already done with the band readers. Thus, a further object of the present invention is to embody both a check scanner and a document processor provided with a bracket base suited to house a keyboard for electronic processor for carrying out the same operation of the bracket base connected to a band reader.

The simultaneous scanner of front and rear face of the check, having a body connected to a bracket base for supporting and fastening a keyboard of a processor, comprises on the top of the body a longitudinal slit for inserting a check thereinto, continuing the slit in a slot directing the check to first reading means of a first face of the check, followed by second reading means of the opposed face of the check means driving the check out of the area containing the first and second reading means of the opposed faces of the same check and, at last, means collecting the checks read by the two reading or scanning means.

Particularly, the first scanning means of a first face of the check consist of a first reading head faced to one of the first driving rollers of the check moving the check itself across the reading head and the second scanning means consist of a second reading head faced to one or more second driving rollers of the check moving the check itself across the second reading head.

The same object of the present invention is alternatively obtained by a scanner and processor for financial documents, different from checks needing other operations, besides the reading or scanning such as printing on at least a face of the document and trimming of portions of a form, having a body connected to a bracket base for supporting and fastening a computer keyboard, comprising: on the top of the body thereof a longitudinal slit for the insertion of the document thereinto, to at least a reading means of a face of the document, followed by at least a printing means of the face itself, being extended the slit in a rail conducing to at least a printing means of either the same face or the opposed face and at last a collecting means for read and processed documents.

According to a preferred embodiment, are used two reading means, one for a first face of the document and the other for the opposed face.

According to another preferred embodiment, are used two printing means, one for a first face of the document and another for the opposed face.

According to another preferred embodiment, at least a separating means for portions of the document is used.

At last, according to a most preferred embodiment, individual collecting means for read, scanned and processed documents are used.

DETAILED DESCRIPTION

Figure 1:
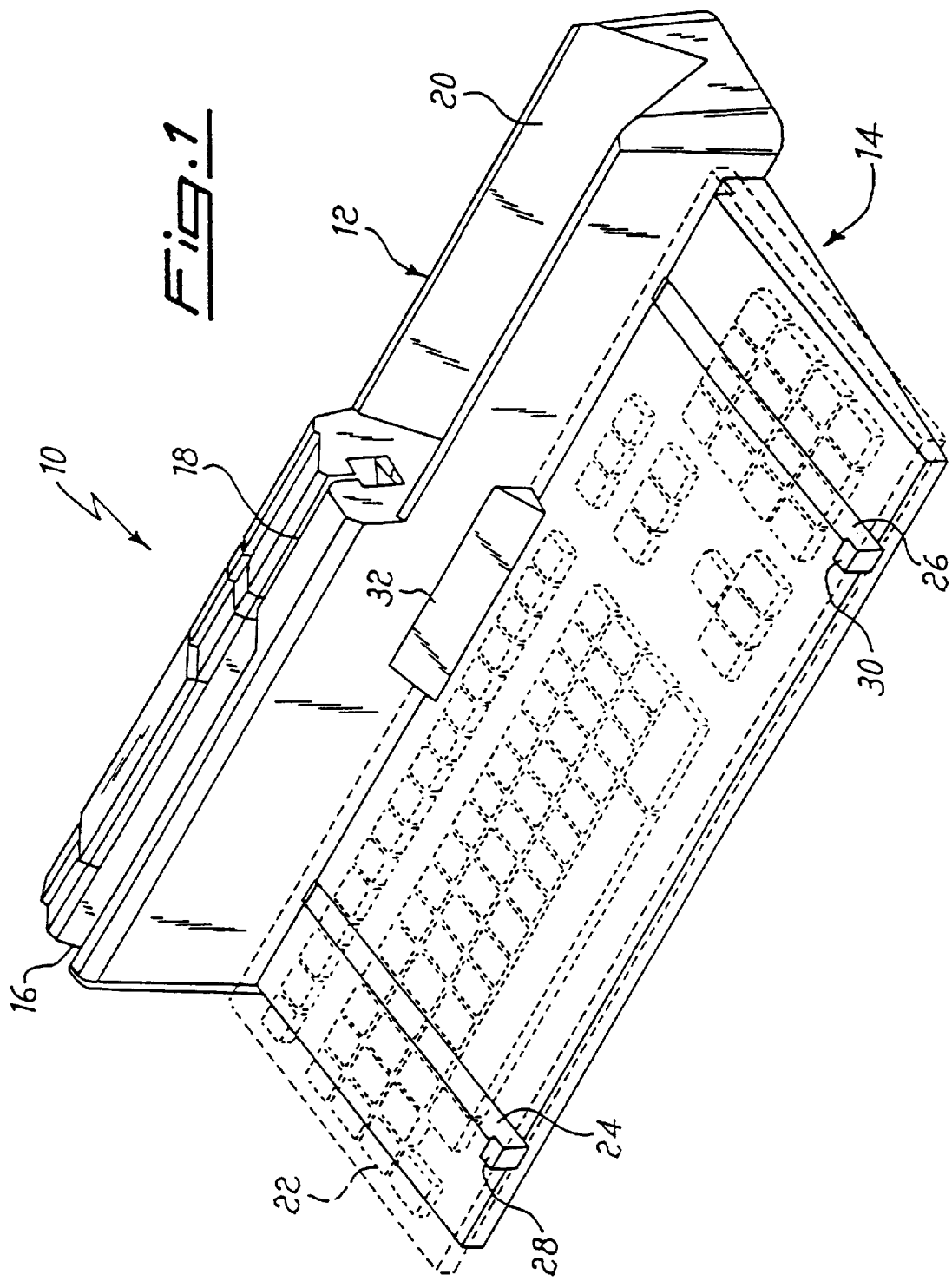
FIG. 1 is a perspective view of a scanner for check bands according to the present invention provided with bracket basis for housing any kind of keyboard.
Figure 2:
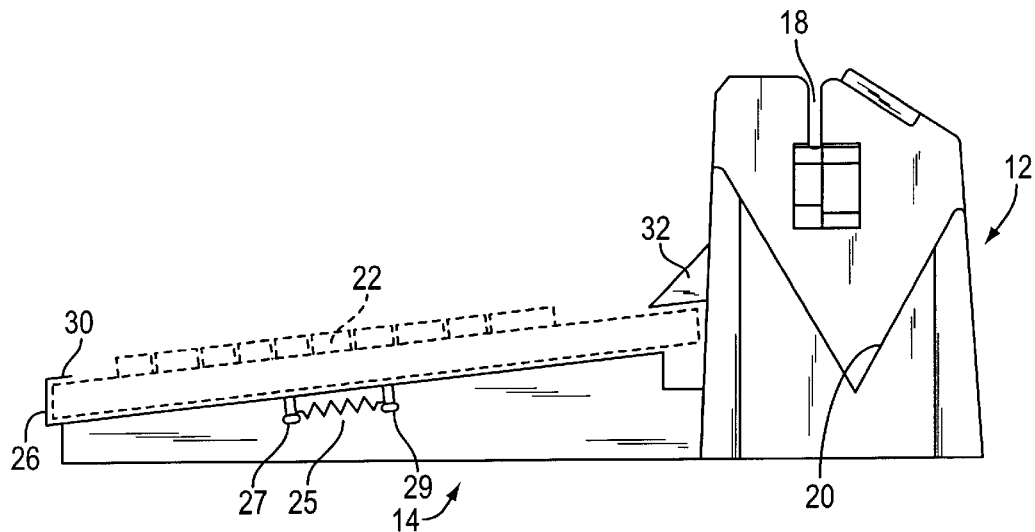
FIG. 2 is a lateral elevational view from the check exit side of the scanner according to the present invention.
Figure 3:
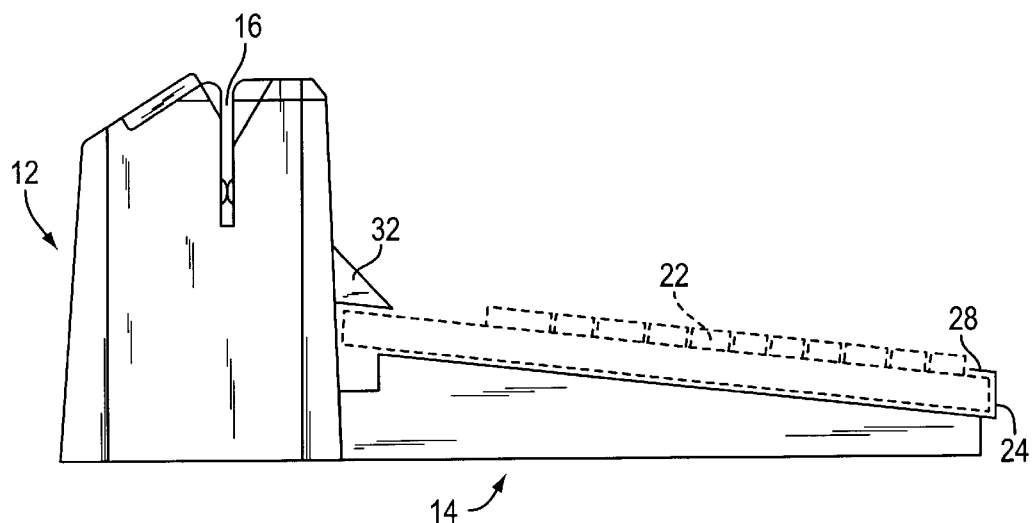
FIG. 3 is a lateral elevational view from the check input side of the scanner according to the present invention.

Referring to FIGS. 1 to 3, it is seen that a check reader or scanner according to the present invention comprises a reader body 12 connected to a bracket base 14. The reader body 12 comprises an input 16 of the documents to be read, a slit 18 of reading portion for the documents themselves and a V shaped slot 20 for collecting the read documents.

The bracket base 14 houses, through simple abutment thereon, a keyboard 22 and is provided with two sliding latches 24 and 26 which, under the obvious drive of proper springs, such as a spring 25 connecting a post 27, mounted to the latch 26, with a post 29 fastened to the base 14, try to approach the reader body 12. The two latches 24 and 26 are further provided with respective small hooked brackets 28 and 30 for assuring a complete fastening of the keyboard to the bracket base 14.

At last, a stopping projection 32 is fastened to the wall of the reader body 12 faced to the bracket base 14 and the keyboard 22 for preventing any lifting of the keyboard 22 owing to sliding along the wall itself.

Referring to FIGS. 4 to 7, it is seen that a check scanner 40 according to the present invention comprises, a scanner body 42 connected to a bracket base 14 identical to the bracket base depicted in FIGS. 1 to 3. The scanner body 42 comprises an upper portion 44 provided with a longitudinal slit 46 suited to receive a check 48 having a first rear face 52 and a second front face 50, or vice versa.

The bracket base 14, as already disclosed with reference to FIGS. 1 to 3, houses, through simple abutment thereon, a keyboard 22 and is provided with two sliding latches 24 and 26 which, under the obvious drive of proper springs (not shown) try to approach the scanner body 42. The two latches 24 and 26 are further provided with respective small hooked brackets 28 and 30 for assuring a complete fastening of the keyboard to the bracket base 14. At last, a stopping projection 62 is fastened to the wall of the scanner body 42 faced to the bracket base 14 and the keyboard 22 for preventing any lifting of the keyboard 22 owing to sliding along the wall itself.

Figure 4:
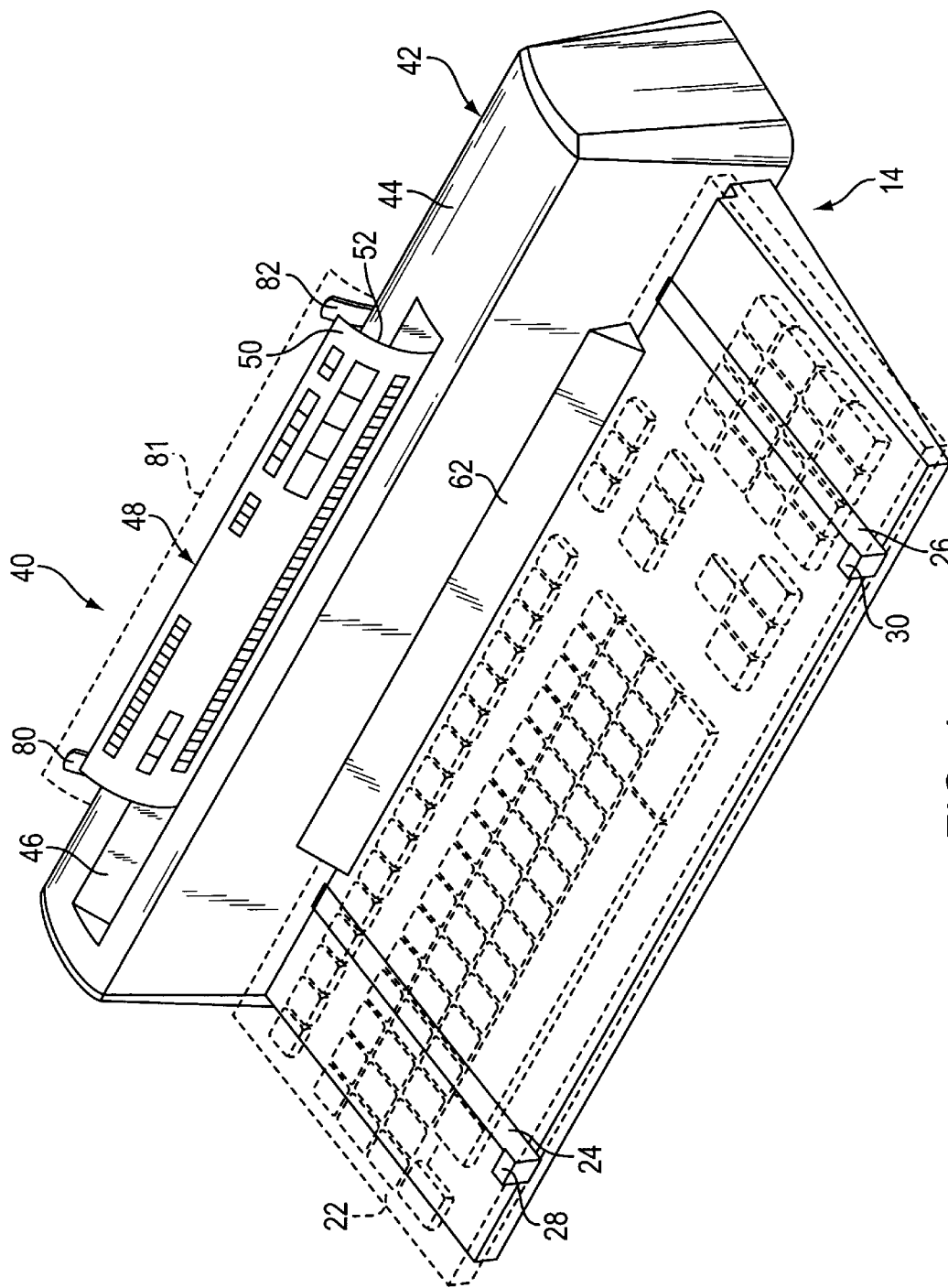
FIG. 4 is a perspective view of a scanner for whole check according to the present invention provided with bracket base for housing any kind of keyboard.
Figure 5:
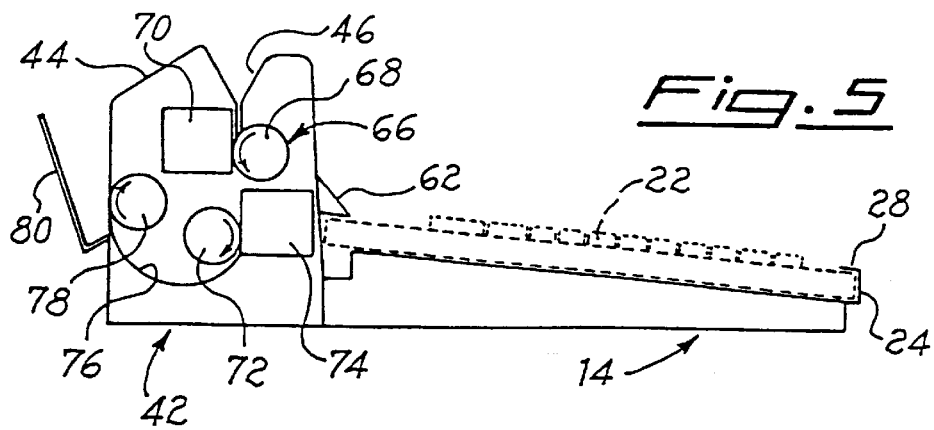
FIG. 5 is a lateral view, in cross-section, of a scanner according to the present invention schematically depicting the path of the check between the scanning heads, from the first head to the exit to the collecting means.
Figure 6:
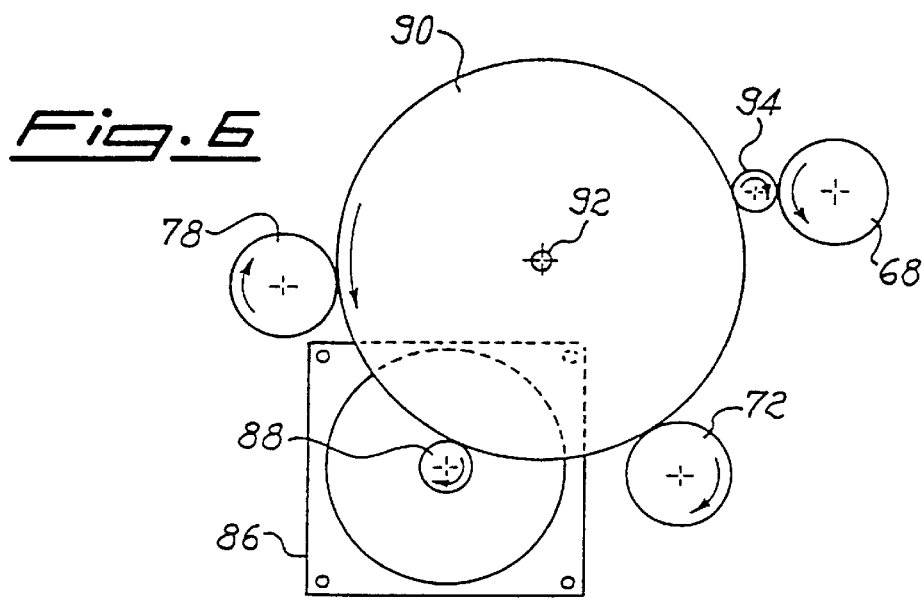
FIG. 6 is a lateral schematic view of a preferred driving mechanism of the check from the first scanning head to the exit to the collecting means.
Figure 7:
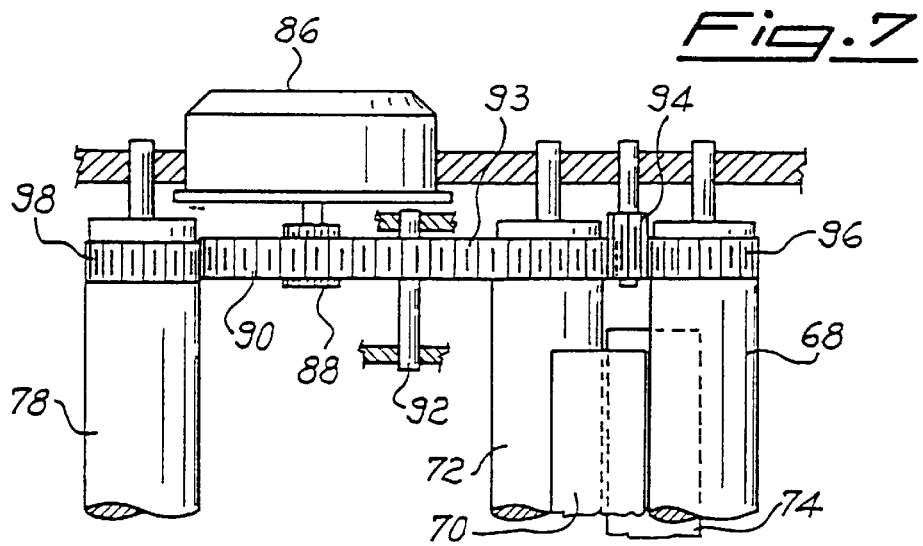
FIG. 7 is a schematic partial top view of the same driving mechanism depicted in FIG. 6.

Referring now particularly to FIGS. 5 to 7, it is seen that the scanner 66 comprises a first driving roller 68 faced to a first reading head 70, a second driving roller 72 faced to a second reading head 74, a rail 76 for directing checks and a third driving roller 78 for extracting scanned checks from the scanner 66. The third roller 78 is followed by collecting means of the scanned checks, which in the FIGS. 4 and 5 are depicted as two planar folded strips 80 and having upside turned concavity. Alternatively, as depicted in FIG. 4 by dashed line 81, the strips 80 and 82 can be replaced by a continuous upwards folded sheet 81 (shown in part in FIG. 4).

The driving mechanism 84, particularly depicted in FIGS. 6 and 7, consists of an electric motor 86 driving a pinion 88 meshing a central gear 90, provided with rotation axis 92 and wheel crown 93, driving the first driving roller 68 through an intermediate sprocket 94 engaging a gear 96 thereof, the second driving roller 72 through direct meshing with the crown 93 and the third driving roller 78 through direct meshing of its gear 98 with the crown 93 of the central gear 90. Of course, the intermediate sprocket 94 between the central gear 90 and the driving roller 68 could be omitted and intermediate sprockets between the central gear 90 and the driving roller 72 and 78 could be used, provided that an inversely turning electric motor 86 is used, without changing anything else in the scope of the invention.

Figure 8:
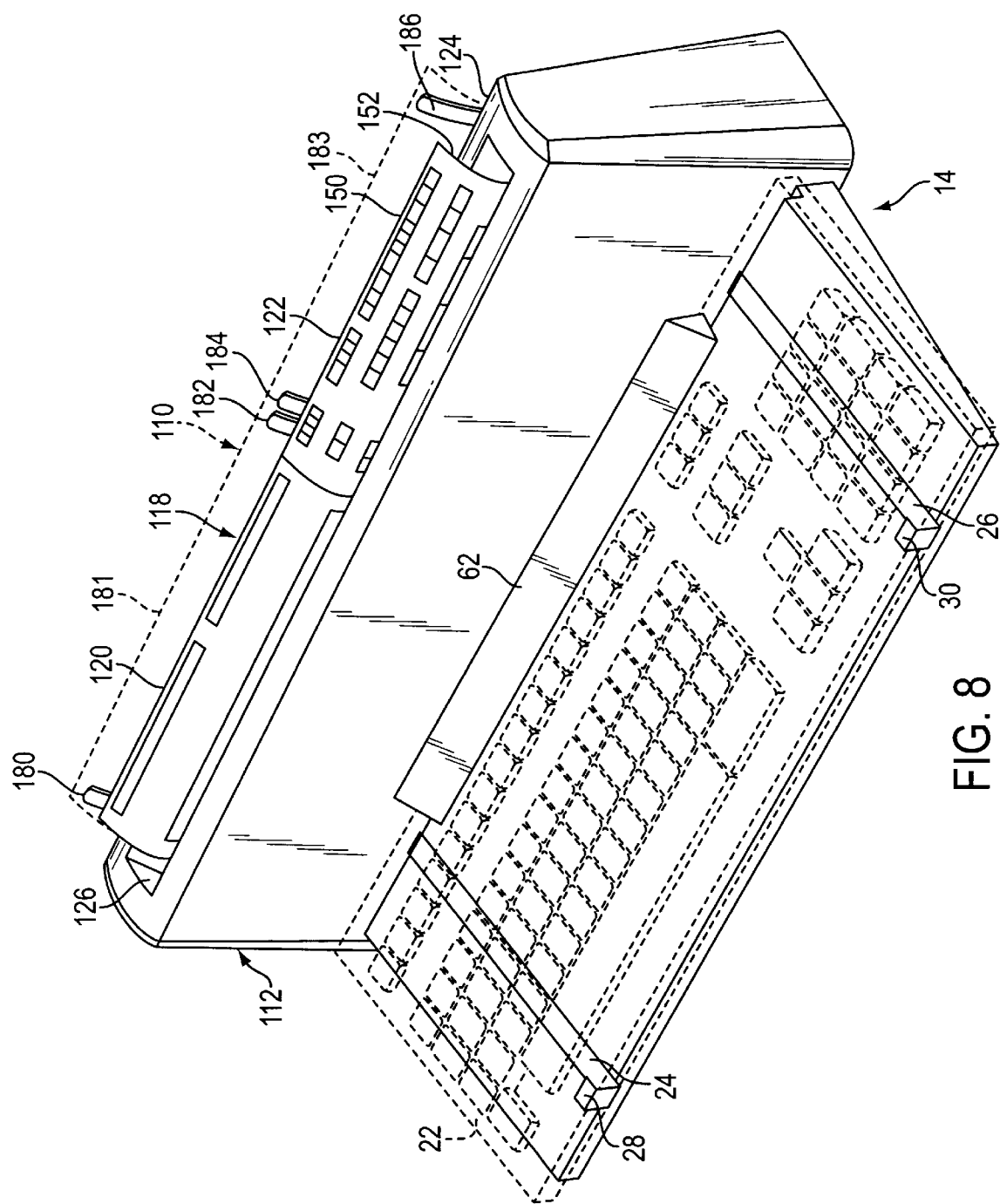
FIG. 8 is a perspective view of an alternative scanner according to the present invention, suitable to read, print and cut forms different from checks, as for example forms for post office accounts incorporated in printed forms, such as the forms suited for paying utility bills, also provided of a bracket base for housing any kind of keyboard.
Figure 9:
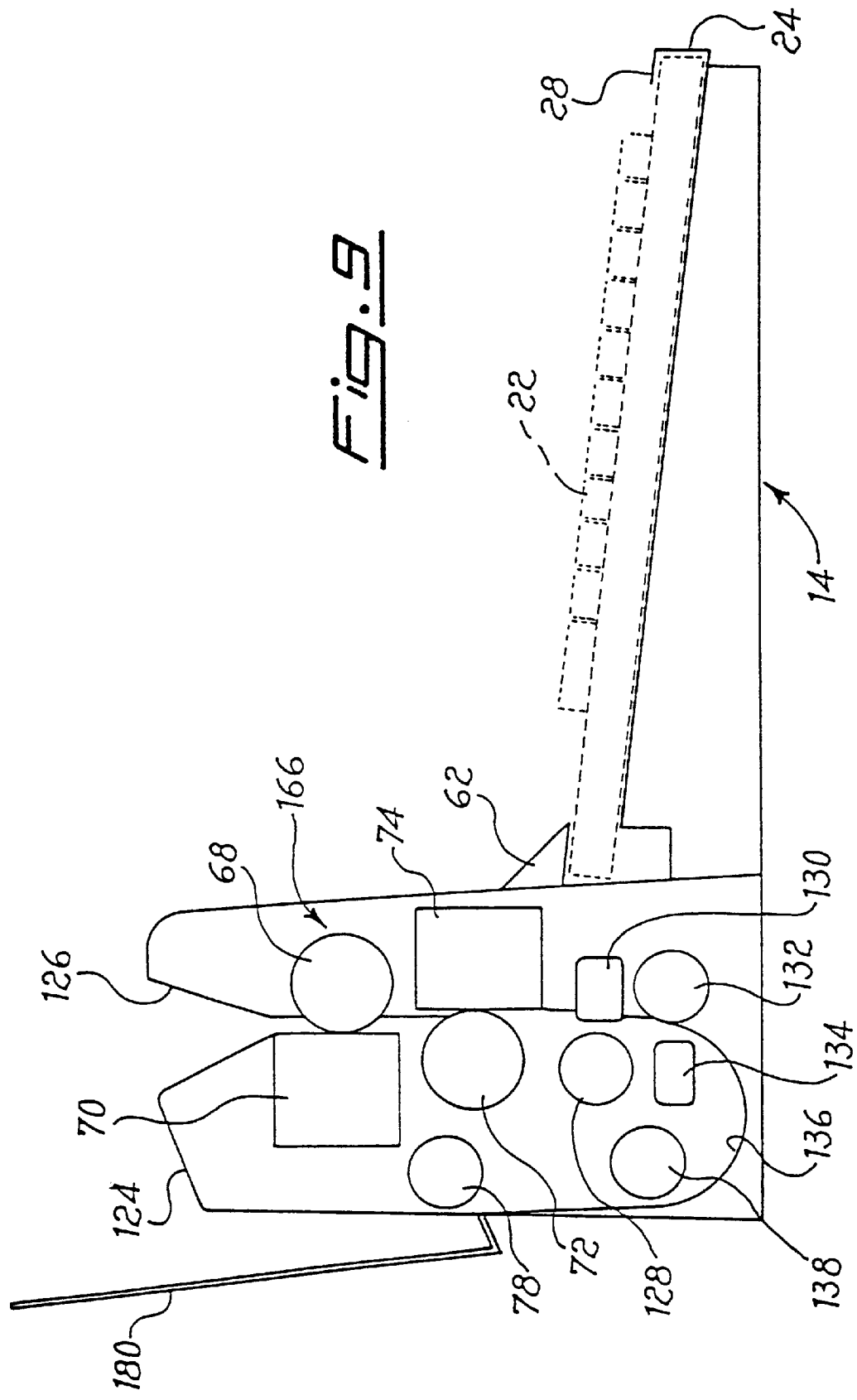
FIG. 9 is a lateral cross-section view of the alternative scanner according to the present invention depicting schematically the path of the document staring from the first scanning head, pursuing to the second scanning head, a first front printer a second rear printer, a trimmer for shearing the bill from the remaining document and at last the collecting means of the portions of the scanned and processed documents.

Reference is now made to FIGS. 8 and 9 depicting a scanner and processor 110 for documents different from checks as, for example, post office account forms. The scanner and processor 110 according to the present invention comprises a scanner body 112 connected to a bracket base 14, identical to those depicted in FIGS. 1 to 5. The scanner body 112 comprises an upper portion 124 provided with a longitudinal slit 126 suited to receive a document 118 having a first rear face 152 and a second front face 150, or vice versa. The document IIS can be divided in two portions 120 and 122, as depicted in FIG. 5, of which, for example the portion 120 is a form for making payments, such as a post office account form, and the portion 122 is a printed form having information for accounting purposes, such as an invoice for facility services (electric power, gas, phone, etc.).

The bracket base 14, as it has been disclosed for the preceding embodiments, houses, through simple abutment thereon, a keyboard 22 and is provided with two sliding latches 24 and 26 which, under the obvious drive of proper springs (not shown), try to approach the scanner body 112.

The two latches 24 and 26 are further provided with respective small hooked brackets 28 and 30 for assuring a complete fastening of the 5 keyboard to the bracket base 14.

Alternatively, as depicted in FIG. 8 by dashed lines, the planar folded strips 180,182,184 and 186 can be replaced by two continue upward folded sheets 181 and 183.

At last, a stopping projection 62 is fastened to the wall of the reader body 112 faced to the bracket base 14 and the keyboard 22 for preventing any lifting of the keyboard 22 owing to sliding along the wall itself.

Referring now particularly to FIG. 9, it is seen that a scanner 166 comprises a first driving roller 68 faced to a first reading head 70, a second driving roller 72 faced to a second reading head 74, a slot 136 for document forwarding and a third roller 78 for extracting the scanned document from the scanner 166. After the second reading head 74 are inserted a first printing head 134 cooperating with a printer roller 128, a second printing head 134 cooperating with a printer roller 132, providing to print types on the front face 150 and the rear face 152 of the document 118, respectively.

The slot 136 forwards the document to a circular trimmer 138 providing to separate the account form portion 120 from the invoice portion 122 (FIG. 8). The third roller 78 is followed by collecting means of the scanned and processed documents, which are depicted as consisting of planar folded strips 180, 182, 184 and 186 having upside turned concavity.

What has been hereabove disclosed is a detailed description of some embodiments of the invention not to be considered in limiting way. In fact any person skilled in this art will be able to devise, from the reading of the above disclosure, logically similar and equivalent approaches to be deemed here covered, as defined by the appended claims. For example, the number of reading or scanning heads can be different (lower) from that depicted in the figures because sometimes it is sufficient to read or scan just one face of a document and thus just one reading head can be sufficient.

Similarly, not always both the printing heads 130 and 134 are necessary, because sometimes it is sufficient to print just a face of the document 118, so that the printing head 130 or 134 can be omitted. Not even the circular trimmer 138 is always necessary, if portions of the document 118 need not to be separated, so the trimmer 138 can be omitted.

What is claimed is:

1. Simultaneous scanner of front and rear faces of documents, having a body connected to a bracket base for supporting and fastening a computer keyboard, the scanner comprising:

on the top of the body a longitudinal slit for the insertion of a check thereinto, continuing the slit in a slot, directing the check, having a first reading means for reading a first face of a document, and a second reading means for reading a second face of the document;

means driving the check out of an area containing the first reading means and second reading means, and means for collecting the check read by the first reading means and the second reading means.

2. Scanner for documents as in claim 1, wherein:

the first reading means for reading the first face of the document consists of a first reading head facing at least one roller driving the document across the first reading head, and the second reading means for reading the second face consists of a second reading head facing at least one roller driving the document across the second reading head.

3. Scanner for documents, as in claim 2, wherein:

the means conveying the document after scanning consists of at least one third roller facing a rail to provide for removal of the scanned document.

4. Scanner for documents, as in claim 3, wherein:

the collecting means of the document consists of at least one support for supporting the documents conveyed from the scanner.

5. Scanner for documents as in claim 4 wherein:

the collecting means consists of two supports in the form of two upward folded rods.

6. Scanner for documents as in claim 4 wherein:

the collecting means consists of two supports in the form of two upward folded planar strips.

7. Scanner for documents, as in claim 4, wherein:

the collecting means consists of a sheet, substantially extended for housing the document, and upward folded.

8. Scanner for documents as in claim 4, wherein the keyboard is standard size for compatibility with computers and the documents are checks.

9. Scanner for documents, as in claim 4, wherein:

the first reading means for reading first the face of the document consists of a first reading head, facing roller driving the document across the first reading head and the second reading means for reading second face consists of a second reading head, facing at least one roller driving the document across the first reading head.

10. Scanner for documents, as in claim 9, wherein:

the means for conveying the document after scanning consists of at least one third roller facing a rail provided to remove the scanned check.

11. Scanner for documents, as in claim 10, wherein:

the collecting means for the document consists of at least one support for supporting the document conveyed from the scanner.

12. Scanner for documents, as in claim 10, wherein:

the collecting means consists of two supports in the form of two upward folded rods.

13. Scanner for documents, as in claim 10, wherein:

the collecting means consist of a sheet, substantially extended for housing the document, and upward folded.

14. Scanner for documents, as in claim 4, wherein:

the collecting means consists of two supports in the form of two upward folded planar strips.

15. Scanner for financial documents, having a body connected to a bracket base for supporting and fastening a keyboard, comprising:

on the top of the body a longitudinal slit for inserting the financial document, continuing the slit in a rail conducting a reading means of a face of the financial document, a printing means of the same face or the opposed face and, a means for collecting read and processed documents.

16. Scanner, as in claim 15, wherein:

two reading means are used, one for a first face of the financial document and the other for the second face of the financial document.

17. Scanner, as in claim 15, wherein:

two reading means are used, one for a second face of the document and the other for the opposed first face thereof.

18. Scanner, as in claim 15, wherein:

two printing means are used, one for a first face of the document and the other for the opposed second face.

19. Scanner, as in claim 15, wherein:

two printing means are used, one for a second face of the document and the other for the opposed first face.

20. Scanner, as in claim 15, further comprising:

a trimming means for trimming portions of the document.

21. Scanner, as in claim 15, further comprising:

individual collecting means for read, processed and scanned documents.

* * * * *